Figures 1, 2:
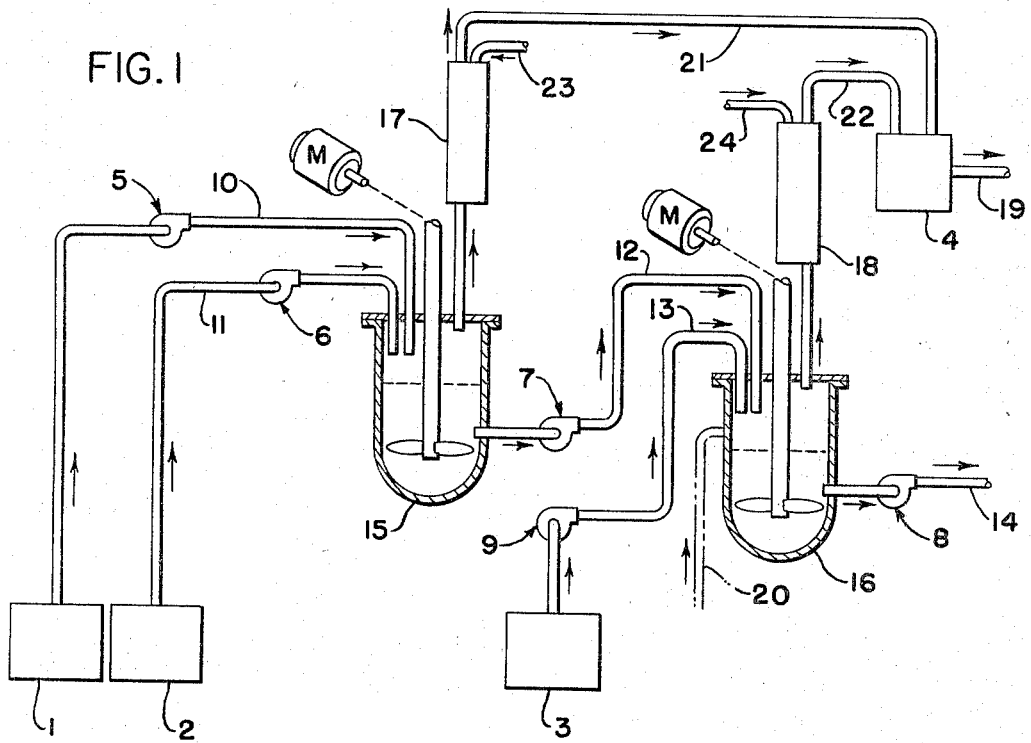

INVENTORS.
HARLEY F. HARDMAN &
ARTHUR F. MILLER
BY
Leland ... Chapman
ATTORNEY

United States Patent Office 3,325,534
Patented June 13, 1967

3,325,534
α,β-OLEFINICALLY UNSATURATED ESTERS BY HYDROLYZING THE CORRESPONDING NITRILE
Harley F. Hardman and Arthur F. Miller, Lyndhurst, Ohio, assignors to The Standard Oil Company, Cleveland, Ohio, a corporation of Ohio
Filed Sept. 8, 1964, Ser. No. 394,966
11 Claims. (Cl. 260—486)

The present invention relates to a process for preparing α,β-olefinically unsaturated carboxylic acids and their esters. More particularly, it is directed to a method for converting α,β-monoolefinically unsaturated nitriles with water and an aqueous mineral oxyacid such as sulfuric acid to intermediate products which, in turn, are esterified with an alcohol. Intermediate products may be hydrolyzed to form the α,β-olefinically unsaturated carboxylic acid which may be recovered as such or recycled and esterified to form additional ester.

An objective of this invention is to obtain high yields of pure esters of α,β-olefinically unsaturated carboxylic acids.

A further objective of this invention is to minimize the loss of alcohol through ether formation during the conversion of an α,β-olefinically unsaturated nitrile to the corresponding ester.

Another objective of this invention is to minimize polymer formation during the conversion of α,β-olefinically unsaturated nitriles to their corresponding esters.

Another objective of this invention is the provision of means for the production of a product which can be an acrylic ester, a mixture of acrylic esters, or a mixture of an acrylic ester and an acrylic acid.

That the foregoing and other objectives have been achieved by the process of this invention will become apparent to those skilled in the art from a reading of the following description and examples.

We have discovered a novel process for converting α,β-monoolefinically unsaturated nitriles to the esters of the corresponding α,β-monoolefinically unsaturated carboxylic acid comprising reacting the α,β-monoolefinically unsaturated nitrile with a mineral oxyacid such as sulfuric acid and water in one zone, esterifying this reaction product with an alcohol in a multi-stage esterification zone and simultaneously recovering the ester product from each stage of the esterification zone.

The basic chemistry of the hydrolysis of aliphatic nitriles with water in the presence of an acid and the subsequent esterification of the intermediate product with alcohol is well known. The Trusler Patents Nos. 1,581,621 and 1,584,907, now expired, illustrate these fundamental chemical reactions. In the Wiley U.S. Patent No. 2,526,310, these reactions have been adapted specifically to the formation of acrylic acid esters from acrylonitrile. This patent describes a batch process. Difficulty is encountered in polymerization of the ester during the distillation step. An alternative procedure of the Wiley patent causes the predominant formation of acrylic acid in hydrolysis by adding more water to complete the conversion to acrylic acid. The acrylic acid is then separated and esterified.

The Brockway U.S. Patent No. 2,666,782 discloses a process in which acrylonitrile is hydrolyzed by adding it to a mineral oxyacid solution and the resulting intermediate is heated with alcohol and the acrylate ester is distilled as it forms from the single stage esterification reactor. In this prior art process a substantial amount of the alcohol is converted to ether.

The Knapsack British Patent No. 897,943 discloses the preparation of n-butyl acrylate by the hydrolysis of acrylonitrile with water and sulfuric acid to form acrylamide sulfate followed by esterification with n-butyl alcohol.

The Metzger U.S. Patent No. 2,759,016 discloses a process for making alkyl acrylates in which acrylonitrile is reacted with an aqueous mineral oxyacid without external heating and the hydrolyzed mixture is then contacted with alcoholic vapor.

The process of the present invention may be more readily followed by referring to the accompanying drawings.

With reference to FIGURE 1, in the conversion of acrylonitrile to an acrylate ester in the presence of sulfuric acid, for instance, the hydrolyzed nitrile solution, consisting principally of amide sulfate, excess sulfuric acid, excess water, and some acrylic acid is fed continuously from surge tank 1 via pump 5 and line 10 to stirred reactor 15. Alcohol-water solution containing one or more polymerization inhibitors is fed continuously from tank 2 to reactor 15 via pump 6 and line 11. Reactor 15 is maintained at a temperature above the boiling point of the alcohol used by suitable heating devices not shown, but below about 120° C. Product vapors are withdrawn through fractionating column 17 which is designed and operated to permit taking off ether, unreacted nitrile, the alcohol-ester azeotrope and some water as overhead via line 21. Any β-hydroxy and β-alkoxy esters formed are returned to reactor 15 from the bottom of column 17. The liquid phase in reactor 15 composed of unreacted acrylamide sulfate, ammonium bisulfate, sulfuric acid, water and small amounts of alcohol, acrylic acid, acrylate ester and β-hydroxy and β-alkoxy esters is withdrawn continuously via pump 7 and line 12 and charged to reactor 16. Additional alcohol, and water if desired, are charged continuously to reactor 16 via pump 9 and line 13. Reactor 16 is maintained above the boiling point of the alcohol, but below 120° C. Vapors are withdrawn from reactor 16 through fractionating column 18, which is also designed and operated to return to reactor 16 the acrylic acid, β-alkoxy esters and β-hydroxy esters. The overhead, which passes via line 22 to run-down tank 4, contains ether, acrylate ester, alcohol, and small amounts of water. The combined overhead products from run-down tank 4 pass via line 19 to a conventional separation and purification system. The liquid phase withdrawn from reactor 16 via pump 8 and line 14 contains trace amounts of unconverted amide sulfate in addition to acrylic acid and by-product esters. This liquid phase may optionally be processed in a third reactor (not shown) in series to recover the desired ester of acrylic acid, or the acrylic acid may be recovered by conventional means such as distillation with steam, and recycled to reactor 16 via line 20. Alternately, the acrylic acid per se may be recovered.

In order to prevent polymer formation in the fractional distillation column, a small amount of alcoholic solution of one or more polymerization inhibitors is fed to the top of each column via lines 23 and 24. Suitable amounts of inhibitor are from about 0.06 to 0.125 percent by weight of the nitrile fed to the system. A like amount of inhibitor is also preferably present in the alcohol fed to each reactor.

Feed rates and liquid level in the initial reactor 15 are adjusted so as to provide a residence time of 1 to 4 hours, preferably 1.5 to 3 hours. Reaction temperature is adjusted so as to react and distill as ester approximately 50% of the acrylamide sulfate fed. Residence times in the second reactor 16 are also in the range of 1 to 4 hours, but the preferred reaction temperature is somewhat higher in order to remove by distillation the acrylate ester product as completely as possible.

Where the production of acrylate ester is the primary goal of the process, the mole ratios of alcohol/water/nitrile in the first reactor 15 are 0.5–4/1.5–3/1 respectively, with the preferred ratio being 1.5–2.5/1.5–2.5/1. In the second reactor 16 the corresponding ratios are 0.5–3/0–1/1, the preferred values being 1.5–2.5/0–0.5/1.

However, it may be desirable under some circumstances to produce significant amounts of the acrylic acid. In this event, one need only to decrease or eliminate alcohol feed to the second reactor 16 and to increase the amount of water feed, depending on the proportion of acrylic acid desired. If the production of some acrylic acid is desired, the mole ratios of alcohol/water/nitrile used should be in the ranges 0–1.5/1.5–6/1 respectively.

The acrylamide sulfate solution feed for the esterification process may be prepared batch-wise by addition of acrylonitrile to aqueous sulfuric acid solution at a controlled rate to prevent excessive temperatures. Successive batches are transferred to surge tank 1 for continuous feeding to the esterification process. Alternatively, and in accordance with the preferred method, the amide sulfate solution may be prepared continuously by the process outlined in FIGURE 2. Referring now to FIGURE 2, aqueous sulfuric acid, containing polymerization inhibitor is transferred continuously from tank 2 via pump 7 and preheater 6 to the top of countercurrent vapor-liquid contacting column 5. Acrylonitrile is transferred from storage tank 1 via pump 3 and vaporized in vaporizer 4. Acrylonitrile vapors enter column 5 at a point approximately five trays above the bottom. Acrylonitrile vapors are absorbed by sulfuric acid solution in the column 5, and the resulting acrylamide sulfate solution is withdrawn from the bottom via line 9 to the feed surge tank 1 of FIGURE 1. Acrylonitrile vapors which are not absorbed are withdrawn overhead through line 8, condensed and recycled. The temperature of column 5 is controlled by adjusting the temperature of the preheated sulfuric acid, and by external heating, if necessary. In addition to being continuous, this process has the advantages of extreme ease of control, it results in a product of mild thermal history, and a product substantially free of unreacted acrylonitrile. Ordinarily, the presence of unreacted acrylonitrile complicates the ester purification system in later steps of the process.

Column 5 may be of conventional construction, such as a packed tower, or one containing sieve trays, bubble trays, or the like. A convenient reaction temperature for acrylonitrile or methacrylonitrile hydrolysis is 115–120° C., at a column residence time of 24 minutes. Higher reaction temperatures may be used, if desired, with no apparent ill effects up to a maximum temperature of 135–140° C. Above this temperature the product darkens in color and sulfur dioxide is evolved.

Regardless of the precise method of preparing amide sulfate solution, the use of a stoichiometric excess of sulfuric acid and water is desirable in order to obtain complete reaction of the nitrile. On the other hand, too large an excess of sulfuric acid and water tends to reduce yields and increase by-product formation in the subsequent esterification process. The mole ratio of sulfuric acid to nitrile is therefore maintained at from about 1.0 to 1.3, preferably from 1.05 to 1.15. The mole ratios of water to nitrile are likewise maintained in the range of 1.0 to 1.3. The water may be dissolved in the sulfuric acid, or a part may be dissolved in the nitrile feed stream. Hence, if desired, a nitrile-water azeotrope may be used as feed, adjusting the concentration of the sulfuric acid-water solution accordingly.

To reduce still further the net amount of by-product β-alkoxy and β-hydroxy esters made in the esterification process these esters are recycled to the sulfuric acid feed stream directed to nitrile hydroylsis via line 10, FIGURE 2.

The present process has several novel features. The reacting of the alcohol, water and hydrolyzed nitrile in two or more stages while simultaneously removing the ester from each stage reduces losses normally caused by polymerization of the monomeric ester. This is unexpected because the prior art teaches that in a multistage esterification process the alcohol is required to contact the hydrolyzed nitrile in more than one stage in order to achieve the maximum efficiency. The present process also keeps the formation of ether from the alcohol at a minimum.

The use of controlled amounts of alcohol in the esterification reaction has several advantages. There is less chance for the alcohol to add to the double bond of the unsaturated ester so that a minimum amount of the β-alkoxy derivative of the ester is formed. The process is very flexible because it is possible to produce acrylates or methacrylates and acrylic acid or methacrylic acid by regulating the amount of alcohol used and by either recycling the carboxylic acid to produce more ester, or by recovering it. In this process, the useful α,β-monoolefinically unsaturated mononitriles are preferably those having the formula

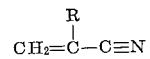

wherein R is a member selected from the group consisting of hydrogen, a lower alkyl group having from 1 to 4 carbon atoms, and a halogen. The most preferred nitriles are those having the foregoing formula wherein R is hydrogen or a methyl group such as acrylonitrile and methacrylonitrile.

The alcohols most useful in the esterification step of this invention are aliphatic mono-alcohols containing from 1 to 4 carbon atoms and preferably primary and secondary alcohols, such as methyl, ethyl, propyl, isopropyl, butyl and isobutyl alcohol. The most preferred alcohols are methyl and ethyl alcohol.

The aqueous mineral oxyacids which may be employed in the present process include sulfuric, phosphoric and similar acids. However, aqueous sulfuric acid is preferred and in the concentration of 15 to 95%.

As was stated earlier, one or more polymerization inhibitors may be used to prevent the formation of polymer in the instant process. Any one or more of the well-known polymerization inhibitors may be used. Suitable inhibitors include hydroquinone, hydroquinone monomethy ether, phenyl-β-naphthylamine, tertiary butyl catechol, pyrogallol and picric acid. Hydroquinone is preferred and only minor amounts are required to minimize polymerization of the charged α,β-olefinically unsaturated nitrile or the reaction products. Based on the charged nitrile 0.2 to 2.0 weight percent of polymerization inhititor is conveniently employed.

The acrylic esters and acids obtained by the process of this invention are very useful chemical compounds. They are used in large quantities as polymerizable materials in the production of synthetic rubbers, synthetic resins and the like.

Demonstrating the flexibility of this process is the fact that a starting mixture of acrylonitrile and methacrylonitrile may be used and a mixture of useful end products, i.e., acrylate ester, methacrylate ester, acrylic acid and methacrylic acid, may be obtained. In many instances the starting nitrile or nitriles may be used directly after being synthesized without further purification and drying in a separate tower. The present process may be carried out in an inert atmosphere if desired.

In the esterification step, the hydrolysis product, along with alcohol and water are fed continuously into a set of multi-stage reactors; each reactor is equipped with a fractionating column and is maintained at a temperature in the range of 60 to 120° C. The amount of alcohol used is 0.1 to 4 moles per mole of nitrile originally charged to the hydrolyzer. The amount of water used is 0.5 to 3 moles per mole of nitrile originally charged to the hydrolyzer. Simultaneously, a distillate of a portion of the alcohol, water, α,β-olefinically unsaturated ester and a small amount of the corresponding ether of the alcohol is withdrawn through the first fractionating column as an overhead stream. A portion of liquid withdrawn from the liquid phase from the first stage comprises the ammonium salt of the mineral acid, the mineral acid, $\alpha,\beta$-olefinically unsaturated carboxylic acid, unconverted intermediate mixture containing a small amount of the $\alpha,\beta$-olefinically unsaturated amide and the $\beta$-hydroxy and and $\beta$-alkoxy derivatives of the said ester as well as some $\alpha,\beta$-olefinically unsaturated carboxylate ester and alcohol. This liquid is continuously passed to the second stage reactor of the esterification zone where it is contacted with alcohol in an amount of 0.2 to 3 moles of alcohol per mole of nitrile originally charged to the hydrolyzer and water in an amount of 0 to 1 mole of water per mole of nitrile originally charged to the hydrolyzer. The distillate simultaneously recovered from the second fractionating column contains some more of the alcohol, acrylate, a small amount of ether and water. The overflow liquid from the second reactor, containing a large amount of ammonium bisulfate and a small amount of intermediate amide, $\alpha,\beta$-olefinically unsaturated ester, $\beta$-hydroxy and $\beta$-alkoxy derivatives of said ester, and the $\alpha,\beta$-olefinically unsaturated carboxylic acid, alcohol and water, is passed to the third stage reactor of the esterification zone where another increment of alcohol and water is added, and the alcohol present is in the amount of 0.1 to 4 moles of alcohol per mole of nitrile originally charged to the hydrolyzer and 0 to 3 moles of water per mole of nitrile originally charged to the hydrolyzer. Again, a portion of the $\alpha,\beta$-olefinically unsaturated ester, alcohol, ether and water are recovered overhead from the fractionating column and the bottoms containing ammonium bisulfate, sulfuric acid, water, acrylic acid, alcohol and a trace of $\alpha,\beta$-olefinically unsaturated ester are further processed. The organic by-products can be stripped from the inorganic material and recovered as such or recycled. The ether can be recycled to the hydrolysis zone.

The unreacted bottoms containing the $\alpha,\beta$-olefinically unsaturated carboxylic acid and alcohol from the last stage of the esterification zone may be recycled.

Unlike the prior art processes wherein the alcohol is added all at once, in the present process the alcohol is split into as many fractions as there are stages in the esterification zone and each addition is carefully controlled.

The $\alpha,\beta$-olefinically unsaturated carboxylic acids and corresponding esters produced in the instant process can be separated and purified by procedures well known to those skilled in the art.

In the following examples which will enable persons skilled in the art to better understand and practice the invention, the amounts of the various ingredients and products are expressed as parts by weight unless otherwise specified.

*Example I*

Acrylonitrile was vaporized and introduced continuously at a temperature of 180° F. at a point just above the fifth tray from the bottom of a vertical countercurrent hydrolysis column containing 25 spaced sieve trays in the amount of 42.3 grams (0.80 mole) per hour. 85% sulfuric acid in the amount of 99.6 grams (0.864 mole) per hour were preheated to 210° F. and introduced above the top tray of the hydrolyzer. The countercurrent hydrolyzer was of such construction that the residence time of the reactants, calculated on the liquid volumes of sulfuric acid and acrylonitrile fed, was 22 minutes. Sufficient external heat was applied to the hydrolyzer to maintain the reaction temperature at 127° C. A small amount of unreacted acrylonitrile was removed overhead, condensed and recycled. There was withdrawn from the bottom of the column 100 ml. per hour of reaction mixture. Analysis of this reaction mixture showed 94.7% conversion of the acrylonitrile fed to acrylamide and 3.4% conversion to acrylic acid. The yield of useful intermediate based on acylonitrile fed to the hydrolyzer was therefore in excess of 98%.

The reaction mixture withdrawn from the bottom of the hydrolysis column was fed continuously into the first stage reactor of a multi-stage esterification apparatus. There were also fed to the reactor 74.1 grams (1.61 moles) per hour of ethanol and 31.4 grams (1.74 moles) per hour of water. The liquid level in the esterification reactor was maintained so that the average residence time in the reactor was 2⅔ hours, calculated on the volume of total liquid feed. The liquid phase in the reactor was maintained at a temperature of from about 107° C. Vapor was withdrawn from the reactor through a fractional distillation column of such design and operation as to permit withdrawing overhead primarily ether, alcohol, water and ethyl acrylate. The overhead was withdrawn at the rate of about 27.5 grams per hour.

The liquid phase was withdrawn from the first stage reactor at the rate of 225 grams per hour simultaneously with the withdrawal of the overhead vapors and the liquid was conducted to a second stage esterification reactor which was maintained at about 113–116° C. To the second stage esterification reactor were fed 89.5 grams (1.94 moles) per hour of ethanol. The liquid level was maintained in the second stage reactor so that the average residence time in the reactor was 2⅔ hours, calculated on the basis of total liquid feed to the reactor. Vapors containing ether, alcohol, water and ester were continuously withdrawn by fractional distillation through a fractional distallation column at the rate of 175 grams per hour and the liquid phase was simultaneously withdrawn from the sump at the rate of 148 grams per hour.

The combined overheads from the first and second stage esterification reactors contained 95.9 mole percent ethyl acrylate based on acrylonitrile fed in the hydrolysis reaction and 2.7 moles percent ether based on the alcohol used. The sump product contained traces of acrylic acid and $\beta$-ethoxyethylpropionate corresponding to yields of 0.8% and 0.6% respectively based on the acrylonitrile.

In the foregoing reaction polymerization was inhibited by the use of 0.21% by weight of hydroquinone dissolved in sulfuric acid. There was also fed into the top of each fractionating column in each stage 10 cc./hr. of an alcoholic solution of hydroquinone containing 1.06 grams hydroquinone per 100 cc. of solution.

The combined overhead product was analyzed and was found to contain:

| | Wt. percent |
|---|---|
| Ethyl acrylate | 37.9 |
| Ethanol | 60.2 |
| Diethyl ether | 1.9 |

The sump product was analyzed and was found to contain in addition to ammonium bisulfate

| | Wt. percent |
|---|---|
| Ethanol | 9.8 |
| Acrylic acid | 0.28 |
| $\beta$-Ethoxyethylpropionate | 0.4 |

The material was light in color and readily yielded a good grade of ammonium sulfate on neutralization and crystallization.

*Example II*

Example I was repeated with the substitution of methanol for ethanol. There were fed to the first esterification reactor 2.14 moles of methanol and 2.14 moles of water per mole of nitrile feed. For the second esterification reactor the methanol/nitrile mole ratio was 2.10. The combined overhead product contained 0.2 mole percent of ether based on the alcohol fed. The yield of methyl acrylate was 95.5%. In addition, yields of 2.4% acrylic acid, 0.5% $\beta$-methoxymethylpropionate and about 0.5% of acrylamide were found in the sump product.

*Example III*

Methacrylonitrile was converted to methyl methacrylate in a manner similar to that described in Example I.

Methacrylonitrile in the amount of 49.6 grams (0.74 mole) per hour and 85% sulfuric acid in the amount of 105 grams (0.912 mol) per hour were fed continuously to a stirred liquid phase reaction system maintained at a temperature of from 113–118° C. The liquid level was maintained in the reactors so as to provide 1.25 hours average residence time in the reactor. Hydrolyzed product was withdrawn continuously and fed to the first esterification reactor of a multistage esterification system. To the first esterification reactor were fed 51.5 grams (1.61 moles) of methanol and 29 grams (1.61 moles) of water. The reactor temperature was maintained at from 95–100° C., and the residence time was about 1.5 hours. To the second esterification reactor were fed 51.5 grams (1.61 moles) of methanol per hour. Temperature of the second reactor was maintained at 113–116° C. and the residence time was two hours.

The combined overheads contained unconverted methacrylonitrile in the amount of 2% by weight based on the methacrylonitrile in the feed. The yield of methyl methacrylate was 94.3 moles percent based on the methacrylonitrile converted. Ether formation amounted to 2.2 moles percent of the methanol fed. The sump product contained 0.9 mole percent methacrylic acid and 0.5 mole percent methacrylamide based on methacrylonitrile converted.

*Example IV*

The reaction product of acrylonitrile and sulfuric acid was prepared by feeding 42.4 grams (0.80 mole) per hour of acrylonitrile and the appropriate amount of 85% sulfuric acid continuously and simultaneously into a stirred liquid phase reaction system maintained at a temperature of from 107–112° C. The liquid level in the reactors was maintained so as to provide 1.25 hours average residence time in the reactor. Reaction product was withdrawn continuously and fed to the first reactor of the multistage esterification system. Alcohol and water feed rates to the first esterification reactor were both 1.6 moles per hour. The liquid phase in the reactor was maintained at 107–110° C., and the average residence time in the reactor was approximately one hour. The yields of ester and ether in the overhead from this reactor, and the amount of β-ethoxyethylpropionate in the reactor liquid product are shown in the following table:

| Acid/Nitrile Feed | 1.04 | 1.12 | 1.40 | 1.75 |
|---|---|---|---|---|
| Ethyl Acrylate, Percent Based on Nitrile | 50.7 | 44.7 | 39.2 | 37.7 |
| β-ethoxyethylpropionate, Percent Based on Nitrile | 0.45 | 0.68 | 0.55 | 1.2 |
| Diethyl Ether, Percent Based on Nitrile | 0.3 | 0.65 | 1.2 | 4.8 |

These data illustrate the desirability of maintaining low mole ratios of sulfuric acid to nitrile in the instant process in order to maximize ester yield and to minimize losses of nitrile to by-product and of alcohol to ether.

*Example V*

This example illustrates the recycle of α,β-olefinically unsaturated carboxylic acid. Example II was repeated, the acrylic acid being separated from the sump product and recycled to the second esterification reactor. After steady state conditions were attained, the methyl acrylate yield was 97.7% of theory based on acrylonitrile used. The amount of acrylic acid recycled was 2.2% on the same basis.

*Example VI*

This example illustrates the operation for increased acrylic acid production. Hydrolyzed acrylonitrile, prepared as described in Example I, was fed into the first reactor of the multistage esterification system at the rate of 0.88 molar equivalent of acrylonitrile per hour. 1.71 moles of ethanol and 1.61 moles of water per hour were fed into the reactor. The temperature was maintained at 105–110° C. and the residence time was 1.4 hours. Liquid phase from this reactor was continuously withdrawn from the first reactor and fed into the second esterification reactor, to which was also fed 2.7 moles of water per hour. The temperature of the second reactor was maintained at 115–120° C., and the residence time at approximately two hours. The combined overheads from the two reactors contained 74.8 moles percent of ethyl acrylate. From the sump product were recovered a 22.1 moles percent yield of acrylic acid and 0.9 percent of β-ethoxyethylpropionate.

*Example VII*

This example illustrates the recycle of β-ethoxyethylpropionate. Example I was repeated, the β-ethoxyethylpropionate being separated from the sump product and recycled to the sulfuric acid feed stream to the hydrolyzer. After steady state conditions were reached, it was determined that the yield of ethyl acrylate increased to 96.5 moles percent based on the acrylonitrile fed. The amount of β-ethoxyethylpropionate recycled was 0.5 percent of the feed.

*Example VIII*

This example illustrates the effect of variations in the esterification temperature in the reaction. The procedures used were according to the procedures given in Example I. A series of runs were made in which the temperature of the first reactor of the multistage esterification system was varied. The method of nitrile hydrolysis, residence times and reactant ratios were maintained constant within each group compared. The data are presented in the following table:

| Nitrile | Alcohol | 1st Reactor Temp., °C. | By-Products, Mole Percent Based on Nitrile Fed | Ether, Mole Percent Based on Alcohol Fed |
|---|---|---|---|---|
| Acrylonitrile | Ethanol | 138 | 10.6 | 2.0 |
|  |  | 124 | 2.7 | 2.9 |
|  |  | 107 | 1.1 | 0.9 |
| Do | Methanol | 127 | 9.5 | 1.2 |
|  |  | 105 | 0.5 | Trace |
| Methacrylonitrile | do | 126 | 14.2 | 2.7 |
|  |  | 109 | 0.6 | Trace |

It is apparent from these data that a low temperature in the initial esterification reactor is beneficial in minimizing by-product formation.

Results similar to those obtained in the foregoing examples were obtained when an equimolar mixture of acrylonitrile and methacrylonitrile was used as the starting nitrile.

We claim:

1. A process for making alkyl α,β-olefinically unsaturated esters by hydrolyzing at least one α,β-olefinically unsaturated nitrile having the formula

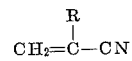

wherein R is a member selected from the group consisting of hydrogen, a lower alkyl group having from 1 to 4 carbon atoms and a halogen with a mineral oxyacid in a hydrolyzing zone, esterifying the intermediate product in a multistage esterification zone; the process comprising the steps of (a) forming major amounts of an α,β-olefinically unsaturated amide and minor amounts of α,β-olefinically unsaturated carboxylic acid from said α,β-olefinically unsaturated nitrile and 1 to 1.3 moles of an aqueous mineral oxyacid per mole of nitrile in the presence of a polymerization inhibitor, (b) continuously feeding a solution of α,β-olefinically unsaturated amide containing reaction mixture from step (a) into the first of a multistage esterification zone into which at the same time are fed an aliphatic alcohol in an amount of 0.5 to 4 moles of alcohol per mole of nitrile utilized in step (a) and water in an amount of 0.5 to 3 moles of water per mole of nitrile utilized in step (a), maintaining the temperature above the boiling point of the alcohol and the nitrile but lower than the boiling point of the corresponding α,β-olefinically unsaturated carboxylic acid, (c) simultaneously fractionally distilling and withdrawing overhead from (b) a distillate comprising alcohol, water, the α,β-olefinically unsaturated ester and a small amount of the corresponding ether of the alcohol, (d) simultaneously withdrawing the liquid phase from (b) which contains the ammonium salt of the mineral oxyacid, the mineral oxyacid, the α,β-olefinically unsaturated carboxylic acid, along with the unconverted intermediate mixture containing minor amounts of the α,β-olefinically unsaturated ester, the alcohol, water, the intermediate α,β-olefinically unsaturated amide, and the β-hydroxy and β-alkoxy derivatives of said α,β-olefinically unsaturated ester, (e) contacting in another esterification stage the said liquid phase from (d) with an additional increment of the aliphatic alcohol in an amount of 0.2 to 3 moles of alcohol per mole of nitrile utilized in (a) and water in an amount of 0 to 3 moles of water per mole of nitrile utilized in (a), (f) simultaneously fractionally distilling as overhead from (e) a distillate comprising the ester, the alcohol, water and a small amount of the ether, (g) simultaneously withdrawing the liquid phase from (e) which is rich in the ammonium salt of the oxyacid, water and alcohol and lean in unconverted intermediate α,β-olefinically unsaturated amide and containing trace amounts of α,β-olefinically unsaturated ester and small amounts of the β-hydroxy and β-alkoxy derivatives of said α,β-olefinically unsaturated ester, and the α,β-olefinically unsaturated acid, (h) repeating steps (e), (f) and (g) from 0 to 3 times, and (i) isolating the ester and isolating the alcohol contained in the overhead obtained in steps (c), (f) and (h), and recycling the alcohol.

2. The process of claim 1 in which the α,β-olefinically unsaturated carboxylic acid formed is separated and recycled to one of the esterification stages.

3. The process of claim 2 in which the α,β-olefinically unsaturated carboxylic acid formed is separated and recycled to an esterification stage other than the first.

4. The process of claim 1 in which the β-hydroxy and β-alkoxy derivatives of said α,β-olefinically unsaturated ester are separated and recycled to step (a).

5. The process of claim 1 in which the nitrile is acrylonitrile, the alcohol is ethyl alcohol, and the ester is ethyl acrylate.

6. The process of claim 1 in which the nitrile is acrylonitrile, the alcohol is methyl alcohol, and the ester is methyl acrylate.

7. The process of claim 1 in which the nitrile is methacrylonitrile, the alcohol is methyl alcohol, and the ester is methyl methacrylate.

8. The process of claim 1 in which the nitrile is a mixture of acrylonitrile and methacrylonitrile, the alcohol is methyl alcohol, and the ester is a mixture of methyl acrylate and methyl methacrylate.

9. The process of claim 1 in which step (a) is carried out by contacting countercurrently in a vertical reaction zone at least one α,β-olefinically unsaturated nitrile having the formula

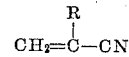

wherein R is a member selected from the group consisting of hydrogen, a lower alkyl group having from 1 to 4 carbon atoms and a halogen in the vapor phase with a mineral oxyacid in the liquid phase in a mole ratio of 1 to 3 moles of acid per mole of nitrile, and in the presence of 1 mole of water per mole of nitrile in the presence of a polymerization inhibitor while maintaining a temperature above the boiling point of the nitrile, but less than 140° C., said acid being fed at the top of said vertical reaction zone and the nitrile being fed at the bottom thereof.

10. The process of claim 9 in which the unreacted nitrile is removed from the top of the vertical reaction zone and recycled to the bottom thereof.

11. The process of claim 10 wherein the mineral oxyacid is sulfuric acid.

No references cited.

LORRAINE A. WEINBERGER, *Primary Examiner.*

ALBERT P. HALLUIN, *Assistant Examiner.*